United States Patent
Kwon et al.

(10) Patent No.: US 12,241,194 B2
(45) Date of Patent: *Mar. 4, 2025

(54) STACK-TYPE LAUNDRY TREATING APPARATUS

(71) Applicant: LG Electronics Inc., Seoul (KR)

(72) Inventors: Daehan Kwon, Seoul (KR); Sanghee Yoo, Seoul (KR); Incheol Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 541 days.

This patent is subject to a terminal disclaimer.

(21) Appl. No.: 17/187,035

(22) Filed: Feb. 26, 2021

(65) Prior Publication Data

US 2021/0262138 A1 Aug. 26, 2021

(30) Foreign Application Priority Data

Feb. 26, 2020 (KR) .................. 10-2020-0023778
Oct. 14, 2020 (KR) .................. 10-2020-0132486

(51) Int. Cl.
 *D06F 29/00* (2006.01)
 *D06F 39/12* (2006.01)

(52) U.S. Cl.
 CPC .......... *D06F 29/005* (2013.01); *D06F 39/125* (2013.01)

(58) Field of Classification Search
 CPC ....................... D06F 29/005; D06F 39/125
 See application file for complete search history.

(56) References Cited

U.S. PATENT DOCUMENTS

| | | | | |
|---|---|---|---|---|
| 1,756,984 A | * | 5/1930 | Mason | F25D 11/00 312/107 |
| 4,821,535 A | * | 4/1989 | Wassilak | D06F 29/005 211/186 |
| 5,926,886 A | * | 7/1999 | Braunschweig | D06F 39/12 68/3 R |

(Continued)

FOREIGN PATENT DOCUMENTS

| | | |
|---|---|---|
| CN | 1721713 | 1/2006 |
| CN | 101705594 | 5/2010 |

(Continued)

OTHER PUBLICATIONS

Office Action in Korean Appln. No. 10-2020-0132486, dated Jan. 25, 2023, 11 pages (with English translation).

(Continued)

*Primary Examiner* — James O Hansen
(74) *Attorney, Agent, or Firm* — Fish & Richardson P.C.

(57) ABSTRACT

A stack-type laundry treating apparatus includes upper and lower treating apparatuses and aligning legs. The upper treating apparatus includes an upper cabinet including an upper side panel and an upper base panel. The lower treating apparatus includes a lower cabinet including a lower side panel. A top of the lower cabinet is covered with the upper base panel. The aligning legs are located inwardly of the upper side panel and the lower side panel and coupled to the upper base panel. When the upper treating apparatus is mounted on the lower treating apparatus, the aligning legs align a mounted position of the upper treating apparatus along the lower side panel.

26 Claims, 13 Drawing Sheets

(56) References Cited

U.S. PATENT DOCUMENTS

| | | | | |
|---|---|---|---|---|
| 5,951,130 | A * | 9/1999 | Braunschweig | D06F 29/00 312/257.1 |
| 7,685,848 | B2 * | 3/2010 | Jeong | D06F 29/005 68/3 R |
| 2004/0245899 | A1 * | 12/2004 | Cho | A47B 91/005 312/351.2 |
| 2004/0263032 | A1 * | 12/2004 | Cho | A47B 67/04 312/330.1 |
| 2005/0139738 | A1 * | 6/2005 | Hwang | D06F 39/125 248/300 |
| 2006/0010934 | A1 | 1/2006 | Kim | |
| 2007/0119216 | A1 | 5/2007 | Jeong et al. | |
| 2011/0241501 | A1 | 10/2011 | Heo | |
| 2018/0195224 | A1 * | 7/2018 | Heo | D06F 39/125 |
| 2021/0262147 | A1 * | 8/2021 | Kwon | D06F 39/125 |
| 2021/0262148 | A1 * | 8/2021 | Kwon | D06F 23/02 |

FOREIGN PATENT DOCUMENTS

| | | |
|---|---|---|
| CN | 106319824 | 1/2017 |
| CN | 106555310 | 4/2017 |
| CN | 107119419 | 9/2017 |
| CN | 206607419 | 11/2017 |
| EP | 3521501 | 8/2019 |
| KR | 10-2006- 0005849 | 1/2006 |
| KR | 10-2011- 0110660 | 10/2011 |

OTHER PUBLICATIONS

Extended European Search Report in European Appln. No. 21159021. 1, dated Jul. 20, 2021, 11 pages.

Office Action in Chinese Appln. No. 202110214568.3, dated Aug. 19, 2022, 21 pages (with English translation).

\* cited by examiner

STACK-TYPE LAUNDRY TREATING APPARATUS

CROSS-REFERENCE TO RELATED APPLICATIONS

This application claims the benefit of Korean Patent Application Nos. 10-2020-0023778, filed on Feb. 26, 2020, and 10-2020-0132486, filed on Oct. 14, 2020, the disclosures of which are hereby incorporated by reference as when fully set forth herein.

TECHNICAL FIELD

The present disclosure relates to a stack-type laundry treating apparatus, and more specifically, relates to a stack-type laundry treating apparatus in which a plurality of treating apparatuses are stacked vertically to increase space utilization, and an upper treating apparatus and a lower treating apparatus are easily manipulated.

BACKGROUND

A laundry treating apparatus may be classified into a front-loading type laundry treating apparatus and a top-loading type laundry treating apparatus according to a manner in which laundry is input. Depending on a manner in which the laundry is treated, the laundry treating apparatus may be classified into a washing apparatus for washing the laundry and a drying apparatus for drying the laundry.

In recent years, the front loading type washing apparatus may have a reduced overall height and increased washing capacity, compared to the top loading type washing apparatus in which an inner tub as a washing tub rotates while standing upright. In the front loading type washing apparatus, twisting of the laundry hardly occur. Thus, demand of the front loading type washing apparatus is increasing.

The front-loading type washing apparatus includes a tub disposed inside a cabinet defining an appearance thereof, a drum rotatable inside the tub, and a driver that rotates the drum. The rotation of the drum may cause friction between the drum, a washing-water, and a washing target (laundry), thereby removing contaminations from the laundry.

Further, in recent years, a drying apparatus having an appearance similar to that of the front loading type washing apparatus is being manufactured. The drying apparatus includes a drying drum rotatable inside a cabinet, a driver that rotates the drying drum, and a hot air supply that supplies hot and dry air into the drum, thereby drying the laundry in a wet state after washing thereof is completed.

When the washing apparatus and the drying apparatus according to the prior art as described above are installed at the same time, the washing apparatus and the drying apparatus are installed side by side in a horizontal direction on an installation face.

However, when an installation space is narrow, the washing apparatus and the drying apparatus are separately installed in separate spaces, and the laundry that has been washed in the washing apparatus is moved/injected to the drying apparatus to dry the laundry.

Recently, a washing apparatus having a mount face or a mounting part for installing a drying apparatus thereon so that the drying apparatus may be stacked on a top of the washing apparatus has been commercially available.

However, as described above, when the washing apparatus and the drying apparatus that may be stacked vertically according to the prior art, and when the washing apparatus has the mount face for mounting the drying apparatus thereon, it is very difficult to fix the drying apparatus at a correct position on the mount face. Thus, when a separate fixing device is not used, the drying apparatus may be separated from the correct installation position when the drying apparatus operates.

Further, when the washing apparatus has a separate mounting part for stacking the drying apparatus on the washing apparatus, the separate installation part is fixed to the washing apparatus, and then the drying apparatus is disposed on the washing apparatus, and then the washing apparatus and the drying apparatus must be fixed to each other via the mounting part. This process is cumbersome.

Therefore, a stacking structure of the washing apparatus and the drying apparatus should be improved such that the drying apparatus may be stacked on and fixed to the washing apparatus more conveniently.

SUMMARY

The present disclosure has been devised to solve the above problem. Thus, a purpose of the present disclosure is to provide a stack-type laundry treating apparatus in which an upper treating apparatus may be stacked on a top of a lower treating apparatus.

Further, the present disclosure has been devised to solve the above problem. Thus, a purpose of the present disclosure is to provide a stack-type laundry treating apparatus including means which is disposed between the lower treating apparatus and the upper treating apparatus, and limits a position of the upper treating apparatus.

Further, the present disclosure has been devised to solve the above problem. A purpose of the present disclosure is to provide a stack-type laundry treating apparatus in which a position of the upper treating apparatus may be corrected when the upper treating apparatus is stacked on the lower treating apparatus.

Further, the present disclosure has been devised to solve the same problem. Thus, a purpose thereof is to provide a stack-type laundry treating apparatus in which an aligning leg is disposed on a bottom of the upper treating apparatus and disposed on a top of the lower treating apparatus.

Further, the present disclosure has been devised to solve the same problem. Thus, a purpose thereof is to provide a stack-type laundry treating apparatus in which the lower treating apparatus and the upper treating apparatus are stacked vertically, and a cabinet structure of the upper treating apparatus is improved to secure an insulated state between the upper and lower treating apparatuses.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

Particular implementations of the present disclosure provide a stack-type laundry treating system that includes upper and lower treating apparatuses and aligning legs. The upper treating apparatus may include an upper cabinet, a drying drum, an upper driver, and an air flow passage. The upper cabinet may include an upper side panel and an upper base panel. The drying drum may be disposed in the upper cabinet and configured to rotate. The drying drum may be configured to receive one or more objects to be dried. The upper driver may be configured to rotate the drying drum. The air flow passage may be configured to supply air to and discharge air from the drying drum. The lower treating apparatus may include a lower cabinet, a tub, a washing drum, and a lower driver. The lower cabinet may include a lower side panel. A top of the lower cabinet may be covered by the upper base panel. The tub may be disposed in the lower cabinet and configured to receive washing-water. The washing drum may be disposed inside the tub and configured to receive one or more objects to be washed. The lower driver may be configured to rotate the washing drum. The aligning legs may be located at the upper side panel and the lower side panel and coupled to the upper base panel. The aligning legs may be configured to, based on the upper treating apparatus being mounted on the lower treating apparatus, align the upper side panel of the upper treating apparatus with the lower side panel of the lower treating apparatus.

In some implementations, the system can optionally include one or more of the following features. The aligning legs may be coupled to the upper base panel and located at the upper base panel. The aligning legs may include at least one pair of aligning legs disposed at each of opposing sides of the upper base panel. The aligning legs may be seated at a top face of the lower side panel and support the upper treating apparatus with respect to the lower treating apparatus. The aligning legs may be seated and configured to slide forward or rearward along the lower side panel. The lower side panel may have opposing inner side faces. Each of the opposing inner side may face of the lower side panel configured to restrict a movement of the aligning legs along a first direction extending between opposing sides of the system. The aligning legs may be coupled to each of opposing sides of the upper base panel and pressed toward an inner side of the upper base panel. The system may include a rail frame is disposed on a top of the lower side panel. The aligning legs may contact the rail frame and slide along the rail frame in a second direction extending between front and rear sides of the system. Each of the aligning legs may include a body that supports a bottom of the upper base panel, an upper end supporting portion protruding from a top of the body, and a lower end supporting portion protruding from a bottom of the body. The lower end supporting portion may be aligned by the lower cabinet. The upper base panel may define a through-hole configured to receive the upper end supporting portion. The upper end supporting portion may define a panel support groove into which a portion of the upper base panel is inserted. The portion of the upper base panel may define an inner face of the through-hole. The body of each of the aligning legs may have a mounting protrusion protruding upward from the body. The upper base panel may define a receiving hole into which the mounting protrusion is fixedly received. The mounting protrusion of the body may have an inclined face that is inclined downward toward the upper base panel. The body of each of the aligning legs may define a slit around the mounting protrusion to thereby elastically support an end of the mounting protrusion. The lower end supporting portion of each of the aligning legs may have at least one leg protruding from a bottom of the body. The at least one leg may be configured to slide and contact the lower cabinet. The at least one leg of the lower end supporting portion may have a support face that contacts each of opposing inner side faces of the lower side panel. The at least one leg of the lower end supporting portion may have an inclined face inclined from the support face toward an inner side of the upper base panel. The system may include a rail frame disposed on a top of the lower side panel. The inclined face of the at least one leg of the lower end supporting portion may be configured to contact the rail frame and slide along the rail frame. The rail frame may have a horizontal frame that contacts a top face of the lower side panel, and a vertical frame that contacts an inner side face of the lower side panel. An edge between the horizontal frame and the vertical frame may have a curved face along which the inclined face of the at least one leg of the lower end supporting portion slides. The curved face may be configured to, based on the upper treating apparatus being seated on the lower treating apparatus, align each of the aligning legs in a first direction extending between opposing sides of the system. The horizontal frame of the rail frame may be configured to support a bottom face of the body of each of the aligning legs and allow the upper treating apparatus to move forward or backward with respect to the lower treating apparatus. The horizontal frame may include a stopper that extends from a rear end of the horizontal frame and is configured to restrict a rearward moving distance of the lower end supporting portion of each of the aligning legs. The lower end supporting portion of each of the aligning legs may include a center leg, and side legs disposed at opposing sides of the center leg and spaced apart from the center leg. The center leg and the side legs may be supported and aligned at the lower cabinet. The upper end supporting portion may define a center leg groove at a position corresponding to a position of the center leg of the lower end supporting portion. The body may define side leg grooves at positions corresponding to positions of the side legs. The center leg groove and the side leg grooves may be configured to receive the center leg and the side legs of another aligning leg on a top of the aligning leg. The aligning legs may include a first aligning leg coupled to a side of the upper base panel, a second aligning leg spaced from the first aligning leg, and a connector connecting the first aligning leg to the second aligning leg. The connector may have a positioning protrusion located offset from a center of the connector. The upper base panel may define a positioning groove at a position corresponding to a position of the positioning protrusion. The lower side panel of the lower cabinet may define opposite sides faces of the lower cabinet. The lower side panel may be flush with the upper side panel. The aligning legs may support the upper treating apparatus with respect to the lower treating apparatus and space the upper side panel apart from the lower side panel. The upper side panel may include a horizontal bent surface spaced from a top face of the lower side panel, a vertical bent surface extending upward from an inner end of the horizontal bent surface up to the upper base panel, and a base support surface horizontally extending from an upper end of the vertical bent surface. The base support surface may be seated on the upper base panel.

One aspect of the present disclosure provides a stack-type laundry treating apparatus comprising: an upper treating apparatus including: an upper cabinet including an upper side panel defining an upper side appearance thereof, and an upper base panel defining a bottom thereof; a drying drum rotatably disposed in the upper cabinet, wherein a drying target is inserted into the drying drum; an upper driver for rotating the drying drum; and an air flow path for supplying and discharging air to and from the drying drum, a lower treating apparatus including: a lower cabinet including a lower side panel defining a lower side appearance thereof, wherein a top of the lower cabinet is covered with the upper base panel; a tub disposed in the lower cabinet, wherein washing-water is stored in the tub; a washing drum disposed inside the tub, wherein a washing target is inserted into the washing drum; and a lower driver for rotating the washing drum; and aligning legs located inwardly of the upper side panel and the lower side panel and coupled to the upper base panel, wherein when the upper treating apparatus is mounted on the lower treating apparatus, aligning legs align a mounted position of the upper treating apparatus along the lower side panel.

In one implementation, the aligning legs are coupled to the upper base panel inwardly of the upper base panel.

In one implementation, the aligning legs include at least one pair of aligning legs disposed on each of both sides of the upper base panel.

In one implementation, the aligning legs are seated on a top face of the lower side panel to support the upper treating apparatus with respect to the lower treating apparatus.

In one implementation, the aligning leg are seated so as to slide forwards or rearwards along the lower side panel.

In one implementation, the lower side panel has opposite inner side faces, wherein each of the inner side faces of the lower side panel limits a left-right directional movement of the aligning legs.

In one implementation, the aligning legs are coupled to each of both sides of the upper base panel such that the aligning legs are pressed inwardly of the upper base panel.

In one implementation, a rail frame is disposed on a top of the lower side panel, wherein the aligning leg is in contact with the rail frame and slides along the rail frame in a front and rear direction.

In one implementation, each of the aligning legs includes: a body for supporting a bottom of the upper base panel; a upper end supporting portion protruding from a top of the body; and a lower end supporting portion protruding from a bottom of the body, wherein the lower end supporting portion is aligned by the lower cabinet.

In one implementation, the upper base panel has a through-hole defined therein into which the upper end supporting portion is inserted, wherein the upper end supporting portion has a panel support groove defined therein into which a portion defining an inner face of the through-hole is inserted.

In one implementation, the body has a mounting protrusion protruding upwardly from the body, wherein the upper base panel has a receiving hole defined therein into which the mounting protrusion is fixedly received.

In one implementation, the mounting protrusion has an inclined face that is inclined downwards toward the upper base panel.

In one implementation, a slit is defined around the mounting protrusion such that one end of the mounting protrusion is elastically supported.

In one implementation, the lower end supporting portion has at least one leg protruding from a bottom of the body, wherein the at least one leg slides and then contacts the lower cabinet.

In one implementation, the leg has a support face in contact with each of opposing inner side faces of the lower side panel, and the leg has an inclined face inclined from the support face inwardly of the upper base panel.

In one implementation, a rail frame is disposed on a top of the lower side panel, and the inclined face slides along the rail frame while being in contact with the rail frame.

In one implementation, the rail frame has a horizontal frame in contact with a top face of the lower side panel, and a vertical frame in contact with an inner side face of the lower side panel, wherein an edge between the horizontal frame and the vertical frame has a curved face along which the inclined face slides.

In one implementation, the curved face aligns the aligning leg in a left and right direction when the upper treating apparatus is seated on the lower treating apparatus.

In one implementation, the horizontal frame supports a bottom face of the body and allows the upper treating apparatus to move forwards or backwards with respect to the lower treating apparatus.

In one implementation, a stopper for limiting a rearward moving distance of the lower end supporting portion inwardly extends from a rear end of the horizontal frame.

In one implementation, the lower end supporting portion has a center leg, and side legs respectively disposed on both sides of the center leg and spaced apart from the center leg by a predetermined spacing, wherein the center leg and the side legs are supported and aligned on the lower cabinet.

In one implementation, a center leg groove is defined in the upper end supporting portion at a position corresponding to a position of the center leg, wherein a side leg groove is defined in the body at a position corresponding to a position of each of the side legs, wherein the center leg groove and the side leg grooves respectively receive a center leg and side legs of another aligning leg on a top of the aligning leg.

In one implementation, the aligning legs include a first aligning leg coupled to one side of the upper base panel; a second aligning leg spaced by a predetermined distance from the first aligning leg; and a connector connecting the first aligning leg and the second aligning leg to each other.

In one implementation, the connector has a positioning protrusion eccentric from a center of the connector, and the upper base panel has a positioning groove defined therein at a position corresponding to a position of the positioning protrusion.

In one implementation, the lower cabinet includes a lower side panel defining both sides faces of the lower cabinet, wherein the lower side panel and the upper side panel constitute the same vertical plane.

In one implementation, the aligning leg supports the upper treating apparatus with respect to the lower treating apparatus so that the upper side panel and the lower side panel are spaced apart from each other.

In one implementation, the upper side panel includes: a horizontal bent surface spaced from a top face of the lower side panel by a predetermined spacing; a vertical bent surface extending upwardly from an inner end of the horizontal bent surface up to the upper base panel; and a base support surface horizontally extending from an upper end of the vertical bent surface, wherein the base support surface is seated on the upper base panel.

According to the stack-type laundry treating apparatus according to the present disclosure, an effect of improving a support state in which the lower treating apparatus supports the upper treating apparatus thereon may be realized by improving a fastening structure between the lower treating apparatus and the upper treating apparatus.

Further, according to the stack-type laundry treating apparatus according to the present disclosure, when the upper treating apparatus is stacked on a top of the lower treating apparatus, a stacking position of the upper treating apparatus may be corrected.

Further, according to the stack-type laundry treating apparatus according to the present disclosure, the aligning leg may be disposed on a bottom of the upper treating apparatus and a top of the lower treating apparatus, thereby improving a stacked state between the upper treating apparatus and the lower treating apparatus.

Further, according to the stack-type laundry treating apparatus according to the present disclosure, a cabinet structure of the upper treating apparatus may be improved, such that an insulated state between the upper treating apparatus and the lower treating apparatus may be secured when vertically stacking the lower treating apparatus and the upper treating apparatus.

In addition to the effects as described above, specific effects of the present disclosure will be described together with the detailed description for carrying out the disclosure.

DETAILED DESCRIPTION

Figure 1:
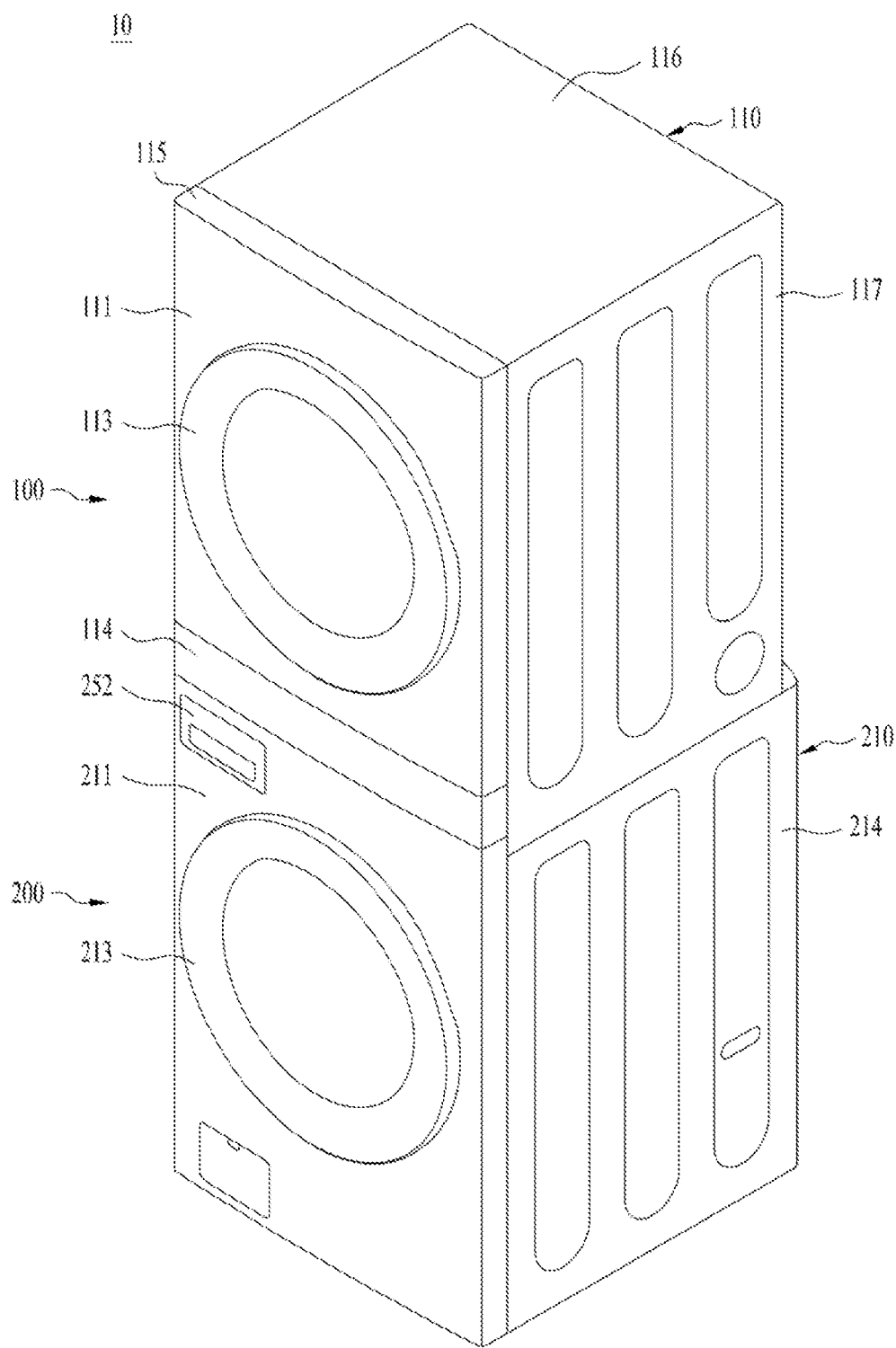
FIG. 1 is a perspective view showing a laundry treating apparatus according to the present disclosure.

Hereinafter, a laundry treating apparatus according to an embodiment of the present disclosure will be described in detail.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

For simplicity and clarity of illustration, elements in the figures are not necessarily drawn to scale. The same reference numbers in different figures denote the same or similar elements, and as such perform similar functionality. Moreover, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

As used herein, the term "and/or" includes any and all combinations of one or more of the associated listed items. Expression such as "at least one of" when preceding a list of elements may modify the entire list of elements and may not modify the individual elements of the list.

First, each of components of a laundry treating apparatus according to an embodiment of the present disclosure will be described in detail with reference to the accompanying drawings.

Figure 2:
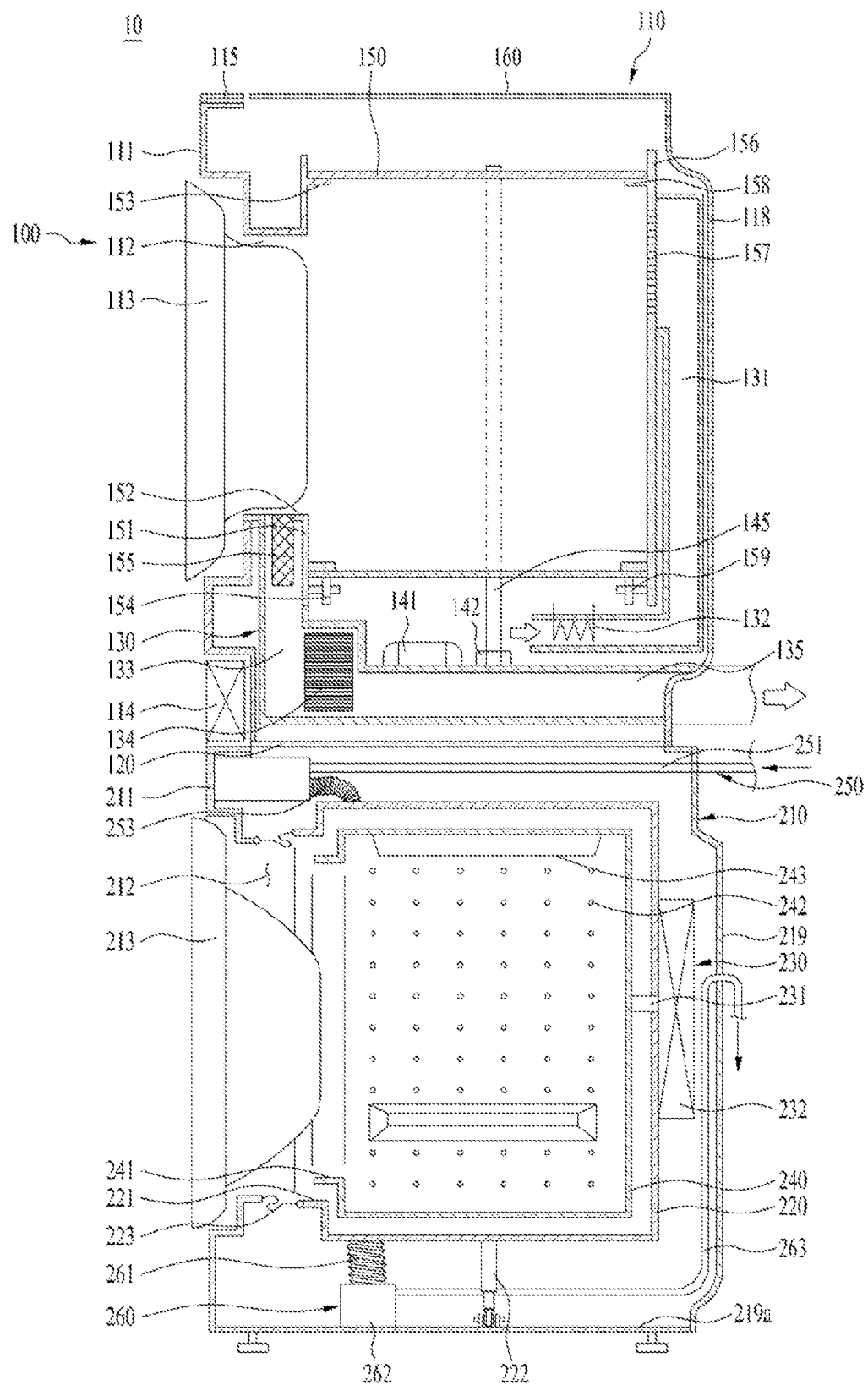
FIG. 2 is a simplified diagram showing an internal structure of the laundry treating apparatus according to the present disclosure.

FIG. 1 is a perspective view showing a laundry treating apparatus according to the present disclosure. FIG. 2 is a simplified diagram showing an internal structure of the laundry treating apparatus according to the present disclosure.

As shown in FIG. 1 to FIG. 2, a laundry treating apparatus 10 according to the present disclosure includes a washing apparatus (hereinafter, referred to as 'lower treating apparatus 200') that performs washing and rinsing of a washing target (laundry), and a drying apparatus (hereinafter, referred to as 'upper treating apparatus 100') that is mounted on a top of the lower treating apparatus 200 and performs drying of a drying target (laundry) that has been washed or needs to be separately dried.

The drying apparatus corresponding to the upper treating apparatus 100 may use a gas burner, an electric heater, a heat pump, etc. as a heat source. Hereinafter, in the present disclosure, an example in which the upper treating apparatus 100 corresponding to the drying apparatus uses the electric heater as the heat source will be described.

However, the present disclosure is not limited thereto. The drying apparatus corresponding to the upper treating apparatus 100 may use the gas burner, the heat pump, etc. as a heat source. That is, as long as when the drying apparatus includes main components of the upper treating apparatus 100, the drying apparatus should be regarded as the upper treating apparatus 100 according to the present disclosure regardless of a type of the heat source of the drying apparatus.

The upper treating apparatus 100 includes an upper cabinet 110 defining an upper appearance thereof and including an upper front panel 111, an upper top panel 116, an upper side panel 117, an upper rear panel 118 and an upper base panel 120, a drying drum 150 rotatably disposed inside the upper cabinet 110 and receiving and drying a drying target using heated air supplied thereto, an air flow path 130 for supplying the heated air to the drying drum 150 and for discharging air used for drying the drying target out of the drying drum 150, and a driver 140 a driver 141, 142, 145 that rotates the drying drum 150 at a predefined rotational speed.

An upper inlet 112 through which the drying target is inserted into the drying drum 150 may be defined in the upper front panel 111. An upper door 113 to open and close the upper inlet 112 may be disposed at the upper front panel 111. A control panel 114 for controlling the upper treating apparatus 100 and the lower treating apparatus 200 may be disposed at a lower level of the upper front panel 111.

In this connection, the control panel 114 may include a manipulator (not shown) for simultaneous or selective control of the upper treating apparatus 100 and the lower treating apparatus 200, and a display (not shown) for simultaneous or selective display of operating statuses of the upper treating apparatus 100 and the lower treating apparatus 200.

A decoration panel 115 that defines a top front face of the upper treating apparatus 100 may be disposed at a top level of the upper front panel 111. The upper top panel 116 that defines a top face of the upper treating apparatus 100 is disposed in rear of the decoration panel 115.

In this connection, the decoration panel 115 may be fixed in a fitting manner to a top face of upper front panel 111. The upper top panel 116 may be seated on a top face of the upper side panel 117 and a top face of the upper rear panel 118 and then fixed thereto using a separate fastener (not shown).

The upper side panel 117 and the upper rear panel 118 may have separate plate forms or may be formed in an integral manner to each other by bending one panel. The upper side panel 117 and the upper rear panel 118 may be integrally formed to improve a strength of the upper treating apparatus 100.

The upper rear panel 118 may have a service panel (not shown) which defines a rear portion of the upper treating apparatus 100, and opens and closes the upper rear panel 118 for maintenance of the upper treating apparatus 100. Further, an air discharge duct 135 of the air flow path 130 to be described later may pass through the upper rear panel 118.

The upper base panel 120 has a mount face 121 on which each of the components (for example, the drying drum 150, the air flow path 130, the driver 141, 142, 145, etc.) of the upper treating apparatus 100 is installed. The upper base panel 120 may be made of a material selected depending on a temperature of a heater 132 in the air flow path 130 of the upper treating apparatus 100.

For example, when the heater 132 includes an electric heater (or a gas burner) generating a relatively high temperature as in an embodiment of the present disclosure, the upper base panel 120 may be made of a metal material. When the heater 132 includes a heat pump that generates a relatively low temperature, the upper base panel 120 may be made of a synthetic resin material.

In the present disclosure, an example in which the lower base panel 219*a* includes a metal plate will be described. In other words, when the lower base panel 219*a* includes the metal plate, thermal deformation thereof due to the heater 132 generating the high-temperature may be prevented. Further, the heat generated from the heater 132 may be prevented from being transferred to the lower treating apparatus 200.

Further, the upper base panel 120 may have a plurality of aligning legs 300 guided to and seated on the lower side panel 214 of the lower treating apparatus 200 which will be described later when the upper treating apparatus 100 is seated on a top of the lower treating apparatus 200. After descriptions of structures of the upper treating apparatus 100 and the lower treating apparatus 200, the aligning leg 300 will be described.

The drying drum 150 may be formed in a cylindrical shape having open front and rear faces. A front plate 151 and a rear plate 156 that rotatably support the drying drum 150 may be disposed in front and rear of the drying drum 150, respectively.

The front plate 151 has an opening 152 defined therein that communicates with the upper inlet 112 defined in the upper front panel 111. The front plate 151 has a front support 153 disposed around an outer circumferential face of the opening 152 and in front of the drying drum 150 and supporting a front inner circumferential face of the drying drum 150.

A front roller 154 is disposed below the front support 153 to rotatably support a front lower portion of the drying drum 150. A plurality of air intake holes 155 through which air from the drying drum 150 is sucked into the air flow path 130 are formed in a lower portion of the front plate 151. The air intake duct 133 of the air flow path 130 is connected to the air intake holes 155.

The rear plate 156 has a plurality of air supply holes 157 defined therein to which the air supply duct 131 of the air flow path 130 to be described later is connected and through which air is supplied into the drying drum 150. A rear support 158 that supports a rear inner circumferential face of the drying drum 150 is disposed outside the air supply hole 157 and in rear of the drying drum 150. A rear roller 159 that rotatably supports a bottom of the drying drum 150 is disposed below the rear support 158.

The air flow path 130 includes the air intake duct 133 communicating with the air intake holes 155 to intake air in the drying drum 150, a fan 134 disposed in the air intake duct 133, an air discharge duct 135 for discharging air moved by the fan 134 outside the upper treating apparatus 100, an air supply duct 131 connected to the air supply holes 157 and intaking air outside the drying drum 150 and supplying the air to the drying drum 150, and the heater 132 that is disposed inside the air supply duct 131 to heat the inhaled air.

In this connection, air in the drying drum 150 is sucked into the air flow path 130, through the air intake duct 133 according to the operation of the fan 134, thereby reducing a pressure of the drying drum 150. As the pressure of the drying drum 150 decreases, air outside the drying drum 150 is supplied to the inside of the drying drum 150 through the air supply duct 131. In this connection, air moving through the air supply duct 131 is heated by the heater 132 disposed in the air supply duct 131 and supplied to the inside of the drying drum 150.

The driver 141, 142, 145 is configured to rotate the drying drum 150 at a predefined rotational speed. The driver 141, 142, 145 may have a motor 141 that generates power, a pulley 142 disposed on a rotation shaft of the motor 141, and a belt 145 connecting the pulley 142 and an outer circumferential face of the drying drum 150.

In this connection, the pulley 142 may be disposed on one end of the rotation shaft of the motor 141, and the fan 134 of the air flow path 130 may be disposed at the other end of the rotation shaft. That is, one motor 141 may be used to simultaneously operate the fan 134 of the air flow path 130 and the drying drum 150. In this case, the drying drum 150 and the fan 134 may be driven by the single motor 141, so that the drying drum 150 and the fan 134 may rotate at a constant rotation speed ratio and at a constant rotation speed.

In another example, although not shown, separate motors (not shown) may be disposed on the drying drum 150 and the fan 134, respectively. When the separate motors are disposed on the drying drum 150 and fan 134, respectively, the rotation speeds of the drying drum 150 and the fan 134 may be individually controlled.

In the above-described upper treating apparatus 100, as the drying target is injected into the drying drum 150 through the upper inlet 112, the drying drum 150 is rotated by the driver 141, 142, 145, and thus the drying target inside the drying drum 150 moves.

Further, as the fan 134 is rotated by the driver 141, 142, 145, the air inside the drying drum 150 is exhausted to the outside of the upper treating apparatus 100 through the air intake duct 133 and the air discharge duct 135, and at the same time, air outside the drying drum 150 is supplied to the drying drum 150 through the air supply duct 131.

In this connection, the air flowing into the drying drum 150 through the air supply duct 131 is heated by the heater 132 disposed in the air supply duct 131 and is converted into high-temperature air, which is in turn supplied to the inside of the drying drum 150, thereby to dry the drying target that moves under the rotation of the drying drum 150.

The lower treating apparatus 200 includes a lower cabinet 210 defining a lower appearance thereof, and including a lower front panel 211, a lower side panel 214, a lower rear panel 219 and a lower base panel 219a, a tub 220 disposed inside the lower cabinet 210 to store washing-water therein, a washing drum 240 that is rotatably disposed inside the tub 220 to wash the input washing target, a driver 230 which is disposed in rear of the tub 220 to rotate the washing drum 240, a water supply 250 that supplies washing-water to the tub 220, a detergent supply 252 that mixes detergent and the washing-water supplied from the water supply with each other to supply the mixture to the washing drum, and a water discharger 260 that drains the washing-water inside the tub 220.

The lower front panel 211 has an lower inlet 212 defined therein through which the washing target is input into the washing drum 240. A lower door 213 for opening and closing the lower inlet 212 is disposed on the lower front panel 211.

The lower side panel 214 and the lower rear panel 219 may be provided in separate plate forms, or may be formed integrally to each other by bending one panel. The lower side panel 214 and the lower rear panel 219 may be integrally formed to improve strength of the lower treating apparatus 200.

The lower front panel 211 and the lower side panel 214 as above-described and the upper front panel 111 and the upper side panel 117 may constitute the same vertically extending layers, respectively. That is, the lower front panel 211, the upper front panel 111 and the control panel 114 located at a lower portion of the upper front panel 111 may constitute the same vertically extending layer.

Further, the upper side panel 117 and the lower side panel 214 may define left and right sides of the upper treating apparatus 100 and the lower treating apparatus 200, respectively, and may constitute the same vertically extending layers.

In one example, the above-described lower side panel 214 may have rail frames 215 which increases strength of a top of the lower side panel 214, and at the same time, on which the aligning leg 300 of the upper treating apparatus 100 slides and is seated. The above-described lower side panel 214 may have a reinforcing frame 215a that extends in a perpendicular to the rail frames 215 and connects thereto. The rail frames 215 and the reinforcing frame 215a will be described in details after the description of the lower treating apparatus 200.

The lower rear panel 219 may have a service panel (not shown) which defines a rear portion of the lower treating apparatus 200, and which opens and closes the lower rear panel 219 for maintenance of the lower treating apparatus 200. Further, a water supply pipe 251 of the water supply 250 and a water discharge pipe 253 of the water discharger 260 to be described later may pass through the lower rear panel 219.

In one example, the lower treating apparatus 200 according to the present disclosure may support the upper treating apparatus 100 thereon. The aligning leg 300 of the upper treating apparatus 100 is inserted and supported between the lower side panels 214 of the lower treating apparatus 200.

Therefore, the lower treating apparatus 200 has an open top face. The rail frames 215 and the reinforcing frames 215a disposed on a top face of each of the lower side panel 214 and the lower rear panel 219 and a top face of the lower side panel 214 of the lower treating apparatus 200 are exposed.

That is, the upper treating apparatus 100 is disposed on the top of the lower treating apparatus 200 according to the present disclosure. The top face of the lower treating apparatus 200 is covered with the upper treating apparatus 100. Therefore, the lower treating apparatus 200 may be free of a separate top panel and a top face of the lower treating apparatus 200 may be covered with the upper treating apparatus 100.

The tub 220 is disposed inside the lower cabinet 210 and is formed in a cylindrical shape and moves via a suspension 222 such as a spring and a damper. A tub opening 221 that communicates with the lower inlet 212 formed in the lower front panel 211 is formed in a front face of the tub 220. The lower inlet 212 of the lower front panel 211 and the tub opening 221 may further have a bellows type gasket 223 to maintain water tightness when the tub 220 moves.

The driver 230 is disposed on a rear face of the tub 220 to rotate the washing drum 240, and has an outer rotor type motor 232 disposed on the rear face of the tub 220 and a rotation shaft 231 that passes through the rear face of the tub 220 and transmits the rotational force of the motor 232.

The washing drum 240 is disposed in inside the tub 220 and is formed in a cylindrical shape and is connected to the rotation shaft 231 so that the drum 240 rotates. The washing drum 240 has a drum opening 241 defined in a front face thereof communicating with the tub opening 221 formed in the tub 220. The washing target is injected through the drum opening 241 to the drum 240. Further, a plurality of water communication holes 242 for flowing the washing-water may be defined in an inner circumferential face of the washing drum 240. A plurality of lifters 243 for moving the washing target may be disposed in the washing drum 240.

The water supply 250 receives washing-water from an external water supply source (not shown) to the laundry treating apparatus 10. The water supply 250 includes a water supply pipe 251 to which the external water supply source is connected, and a detergent supply 252 connected to the water supply pipe 251 and mixing the water and detergent and supplying the mixture to the tub 220, and a water supply hose 253 connecting the detergent supply 252 and the tub 220 to each other.

The water discharger 260 is disposed under the tub 220 to drain the washing-water that has been used in the tub 220. The water discharger 260 includes a water discharge hose 261 connected to a bottom face of the tub 220, the water discharge pump 262 disposed at the water discharge hose 261 to pump the washing-water, and a water discharge pipe 253 to discharge the washing-water pumped by the water discharge pump 262 to the outside.

In the lower treating apparatus 200 as described above, as the washing target is introduced into the washing drum 240 through the lower inlet 212, the detergent and washing-water are supplied to the tub 220 from the water supply 250. As the washing drum 240 rotates by the driver 230, the washing target inside the washing drum 240 moves and the washing process proceeds.

Further, as the washing process is completed, the washing-water inside the tub 220 is discharged to the outside of the lower treating apparatus 200 by the water discharge pump 262 of the water discharger 260, thereby completing the washing process.

In one example, the lower treating apparatus 200 is installed on an installation place, and then the upper treating apparatus 100 is seated on the top of the lower treating apparatus 200, thereby completing the installation of the laundry treating apparatus 10.

Hereinafter, a structure for stacking the lower treating apparatus 200 and the upper treating apparatus with each other will be described in detail with reference to the accompanying drawings.

Figure 3:
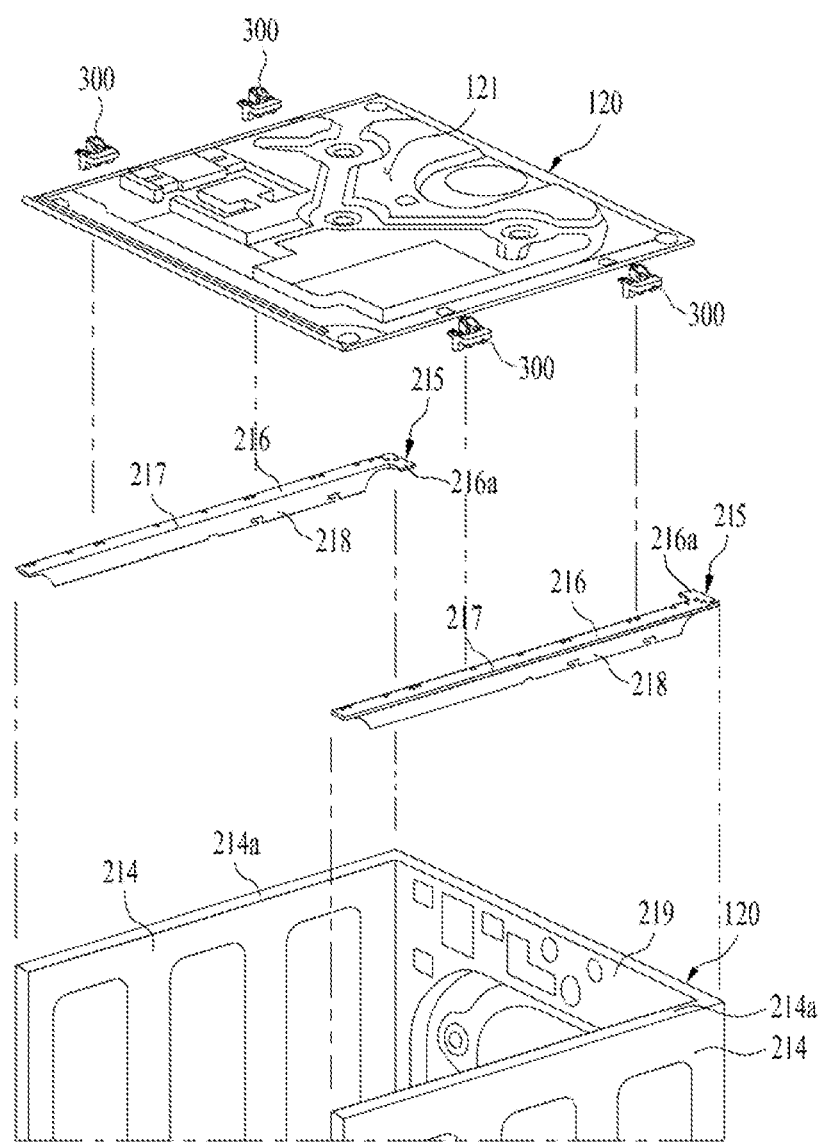
FIG. 3 is an exploded perspective view showing a fastening structure of the laundry treating apparatus according to the present disclosure.
Figure 4:
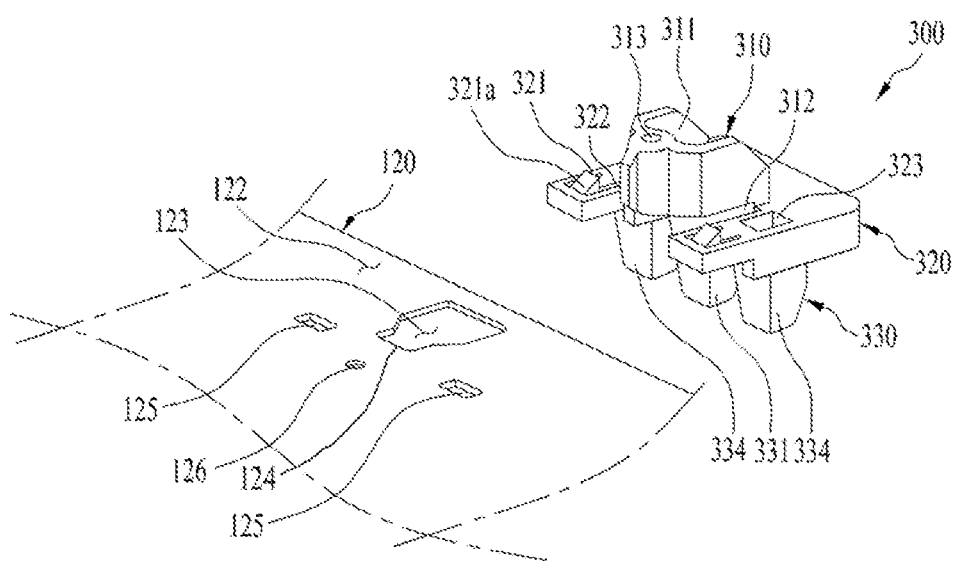
FIG. 4 is an exploded perspective view showing an aligning leg and an upper base to be coupled to each other according to an embodiment of the present disclosure.

FIG. 3 is an exploded perspective view showing a fastening structure of the laundry treating apparatus according to the present disclosure. FIG. 4 is an exploded perspective view showing an aligning leg and an upper base to be coupled to each other according to an embodiment of the present disclosure.

As shown in FIG. 3 to FIG. 4, a plurality of aligning legs 300 are inserted into and coupled to the upper base panel 120 of the upper treating apparatus 100. When the upper treating apparatus 100 is seated on the lower treating apparatus 20, the aligning legs 300 coupled to the upper base panel 120 are interposed between inner side faces of the lower side panel 214 of the lower treating apparatus 200, so that a mounted position of the upper treating apparatus 100 may be aligned by the aligning legs 300.

In one example, as shown in FIG. 3, a pair of aligning legs 300 are respectively coupled to each of both sides of the upper base panel 120, that is, to each of both front and rear sides of the upper treating apparatus 100. Further, the rail frames 215 are respectively coupled to both opposing sides of the top of the lower side panel 214 of the lower treating apparatus 200.

In this connection, the pair of aligning legs 300 located on each of both sides of the upper base panel 120 are inserted inwardly of the upper base panel 120 and are supported on an outer face of the upper base panel 120. That is, two aligning legs 300 are arranged on each of both sides of the upper base panel 120 in the left-right direction of the upper base panel 120.

Further, the rail frames 215 are respectively coupled to opposite inner side faces of the lower side panel 214 and on the top of the lower side panel 214 of the lower treating apparatus 200. In this connection, each of the rail frame 215 has a horizontal frame portion 216 that is seated on the top face of the lower side panel 214 and a vertical frame portion 218 that extends along the inner side face of the lower side panel 214.

In this connection, a curve face 217 (FIGS. 9A and 9B) is formed along and on an outer edge formed by the horizontal frame 216 and the vertical frame 218. When the upper treating apparatus 100 is seated on the lower treating apparatus 200, the aligning leg 300 slides on the curved face 217 and moves inwardly of the rail frame 215.

In one example, the curved face 217 is preferably formed to extend along an entire edge formed by the horizontal frame 216 and the vertical frame 218. That is, when the upper treating apparatus 100 is seated on the top of the lower treating apparatus 200, a position in a front and rear length at which the upper treating apparatus 100 is seated on the top of the lower treating apparatus 200 may vary.

Therefore, considering that the position where the upper treating apparatus 100 is seated on the top of the lower treating apparatus 200 may vary, the curved face 217 may be formed along the entire edge formed by the horizontal frame 216 and the vertical frame 218 and thus contact the aligning leg 300.

Further, a stopper 216a protruding inwardly from the rail frame 215 may be further formed at a rear end of the horizontal frame 216 of each rail frame 215. The stopper 516a limits a distance by which the aligning leg 300 seated on the rail frame 215 moves in a rear direction along the rail frame 215.

That is, when the upper treating apparatus 100 is seated on the lower treating apparatus 200, alignment in the left and right directions of the upper treating apparatus 100 may be made by the aligning legs 300. After the upper treating apparatus 100 has been seated on the lower treating apparatus 200, the upper treating apparatus 100 may be moved in the forward and backward directions of the lower treating apparatus 200 along the rail frame 215.

In this connection, the stopper 216a formed on the rail frame 215 protrudes inwardly of the rail frame 215. When the upper treating apparatus 100 is moved in a rear direction along the lower treating apparatus 200, the aligning legs 300 of the upper treating apparatus 100 may be mounted on the upper treating apparatus 100 to limit a distance by which the upper treating apparatus 100 moves.

In one example, each of the aligning legs 300 that are coupled to each of both front and rear sides of the upper base panel 120 is inserted inwardly of the upper base panel 120 and is coupled to and supported on the upper base panel 120. As the upper treating apparatus 100 is mounted on the lower treating apparatus 200, each of the aligning legs 300 coupled to each of both sides of the upper base panel 120 is seated and supported on an inner faced of each rail frame 215 of the lower side panel 214 of the lower treating apparatus 200.

Therefore, each of the aligning legs 300 of coupled to the upper base panel 120 is supported on the rail frame 215 of the lower side panel 214 such that the rail frame 215 presses the legs inwardly of the upper base panel 120. Thus, the aligning leg 300 is pressed toward the upper base panel 120, and at the same time, a mounted position of the lower treating apparatus 200 with respect to the upper treating apparatus 100 may be aligned by the aligning legs 300.

In one example, at least one aligning leg 300 coupled to the upper base panel 120 may be disposed on each of both sides of the upper base panel 120, that is, on both front and rear sides of the upper treating apparatus 100. The aligning legs 300 coupled to the upper base panel 120 may be coupled thereto using the same fastening structure. In following descriptions, the fastening structure of one aligning leg 300 will be described by way of example.

As shown in FIG. 4, at least one leg receiving portion 122 is formed on each of both sides of the upper base panel 120. The aligning leg 300 is inserted inwardly of the upper base panel 120, that is, the left and right directions onto each of both sides of the upper base panel 120 and supported thereon.

In one example, the aligning leg 300 may include a body 320 supporting a bottom of the upper base panel 120, a upper end supporting portion 310 protruding upward from the body 320 and supporting a top face of the upper base panel 120, and a lower end supporting portion 330 that protrudes downwardly from the body 320 and is supported on the lower side panel 214.

This aligning leg 300 is made of synthetic resin and may be manufactured using injection molding. Preferably, the leg 300 may be made of an insulating material that may electrically insulate the upper treating apparatus 100 and the lower treating apparatus 200 from each other. The insulating material may be selected from a variety of materials according to need, such as a plastic material, a rubber material, or a mixed material of plastic and rubber.

In this connection, a panel support groove 312 into which an end of the upper base panel 120 is inserted is formed between the body 320 and the upper end supporting portion 310. At least one coupling protrusion 321 inserted into and mounted on the upper base panel 120 is formed at a front end of the body 320, and protrudes upwardly.

In this connection, the leg receiving portion 122 formed on the upper base panel 120 has a through-hole 123 in which the upper end supporting portion 310 of the aligning leg 300 is inserted and mounted, and a receiving hole 125 in which the mounting protrusion 321 of the aligning leg 300 is inserted and fixed.

In one example, the through-hole 123 is formed in a shape corresponding to an outer shape of the upper end supporting portion 310 of the aligning leg 300. A protruding groove 124 that is recessed from the through-hole 123 is formed inside the upper base panel 120. The protruding groove 124 is inserted into the panel support groove 312 formed in the aligning leg 300 as the aligning leg 300 moves inwardly of the upper base panel 120 when the aligning leg 300 is mounted thereon.

Further, a pair of receiving holes 125 of the leg receiving portion 122 are arranged in a symmetrical manner with respect to the through-hole 12 and are formed inwardly of the through-hole 12. As the aligning leg 300 is inserted into the leg receiving portion 122 and moved inwardly of the upper base panel 120, the mounting protrusion 321 is inserted in the receiving hole 125 to prevent the alignment leg 300 from being separated from the leg receiving portion 122.

Hereinafter, referring to the attached FIG. 4 to FIG. 7, the aligning leg will be described in more detail.

Figure 5:
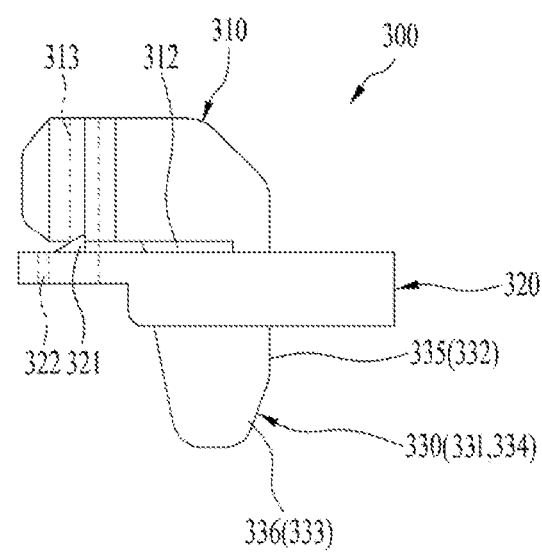
FIG. 5 is a side view showing an aligning leg according to an embodiment of the present disclosure.
Figure 6:
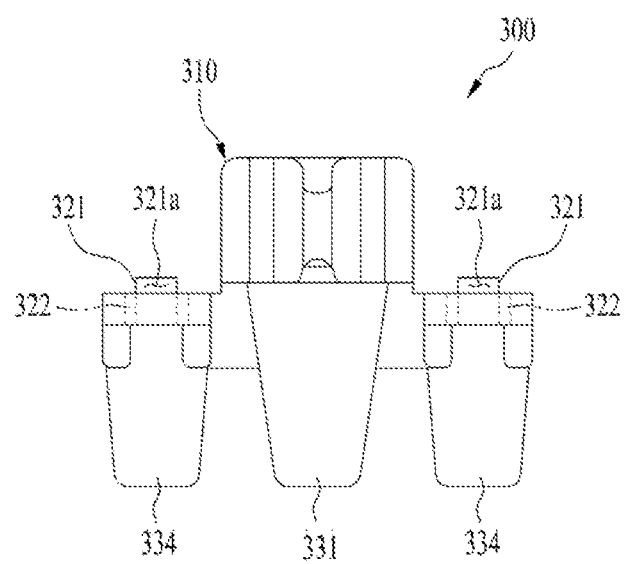
FIG. 6 is a front view showing an aligning leg according to an embodiment of the present disclosure.
Figure 7:
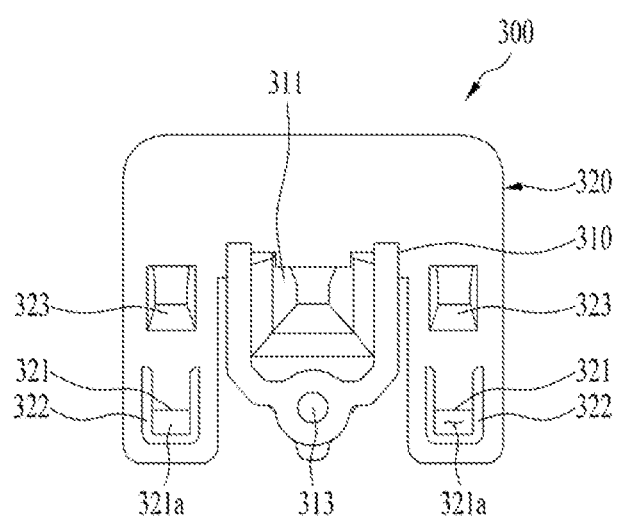
FIG. 7 is a plan view showing an aligning leg according to an embodiment of the present disclosure.

FIG. 5 is a side view showing an aligning leg according to an embodiment of the present disclosure. FIG. 6 is a front view showing an aligning leg according to an embodiment of the present disclosure. FIG. 7 is a plan view showing an aligning leg according to an embodiment of the present disclosure.

As shown, the body 320 of the aligning leg 300 is formed in a plate shape with a predetermined thickness. A pair of coupling protrusions 321 mounted in the receiving holes 125 of the leg receiving portion 122 protrude from a top face of the body 320 facing toward the upper base panel 120.

The mounting protrusion 321 has an inclined face 321a that is inclined downwards toward the upper base panel 120. The inclined face 321a allows the mounting protrusion 321 to slide along a bottom of the upper base panel 120 when the aligning leg 300 is moved toward the upper base panel 120 to be mounted on the upper base panel 120.

In one example, a slit 322 may be further formed at a downward side of the inclined face and both sides of the mounting protrusion 321. The slit 322 elastically supports an upward side of the inclined face of the mounting protrusion 321 so that when the mounting protrusion 321 slides along the bottom of the upper base panel 120, the mounting protrusion 321 may elastically deform on the bottom of the upper base panel 120.

The mounting protrusion 321 is inserted into the receiving hole 125. Thus, when the aligning leg 300 is mounted on the upper base panel 120, the aligning leg 300 may be prevented from being separated outwardly of the upper base panel 120.

The upper end supporting portion 310 of the aligning leg 300 protrudes from the top face of the body 320 to a predetermined height. The panel support groove 312 having a width equal to or greater than a thickness of the upper base panel 120 with respect to a top face of the body 320 is formed in a bottom of the upper end supporting portion 310.

When the aligning leg 300 is mounted on the upper base panel 120, one side of the through-hole 123 is inserted into the panel support groove 312 such that the body 320 supports the bottom face of the upper base panel 120 and at the same time the panel support groove 312 supports the top face of the upper base panel 120.

As one side of the through-hole 123 is inserted into this panel support groove 312, the body 320 presses the bottom face of the upper base panel 120, and the panel support groove 312 supports the top face of the upper base panel 120 to prevent the aligning leg 300 from deviating in a vertical direction.

The lower support 330 may have a plurality of legs 331 and 334 formed on the bottom face of the body 320 and arranged in a direction parallel to the rail frame 215 of the lower side panel 214. The lower end supporting portion 330 may have a center leg 331 extending downward from a center of the body 320 and both side legs 334 spaced apart from the center leg 331 by a predetermined distance.

In this connection, the side legs 334 may be arranged on both sides of the center leg 331. Further, the center leg 331 and the side legs 334 may be arranged side by side and may have the same shape.

In one example, the center leg 331 and the side legs 334 may respectively have a center inclined face 333 and side inclined faces 336 that may slide on the curved face 217 of the rail frame 215.

That is, the center inclined face 333 and the side inclined faces 336 formed on the center leg 331 and the side legs 334, respectively may function as follows. When the upper treating apparatus 100 is seated on the lower treating apparatus 200, the center inclined face 333 and the side inclined faces 336 are in contact with the curved face 217 of the rail frame 215 so that the center leg 331 and the side legs 334 may be moved inwardly of the rail frame 215.

Further, the center leg 331 and the side legs 334 may respectively have a center support face 332 and side support faces 335 supported on the vertical frame 218 of the rail frame 215.

That is, the center support face 332 and the side support faces 335 formed on the center leg 331 and the side legs 334 respectively may be pressed by the vertical frame 218 of the rail frame 215 after the upper treating apparatus 100 has been seated on the lower treating apparatus 200.

In one example, the upper end supporting portion 310 has a center leg groove 311 formed in a position thereof corresponding to a position of a bottom of the center leg 331. Side leg grooves 323 are formed in the top face of the body 320 in positions corresponding to bottoms of the side legs 334, respectively.

In this connection, the center leg groove 311 and the side leg grooves 323 receive a center leg 331 and side legs 334 of another aligning leg 300 on the corresponding aligning leg 300, respectively, thereby to prevent movement of another aligning leg 300.

Further, a screw receiving hole 313 may be further formed in a front end of the upper end supporting portion 310, that is, a side face thereof facing toward an inner face of the upper base panel 120. A fastener (for example, a screw, etc.) may pass through the upper base panel 120 and may be inserted into the screw receiving hole 313. In this connection, a screw receiving hole 313 through which a fastener passes may be defined in the leg receiving portion 122 of the upper base panel 120 at a position corresponding to the screw receiving hole 313.

Hereinafter, referring to the attached FIGS. 8A to 8C, the aligning leg 300 and the upper base panel 120 to be coupled to each other will be described in detail.

Figure 8A:
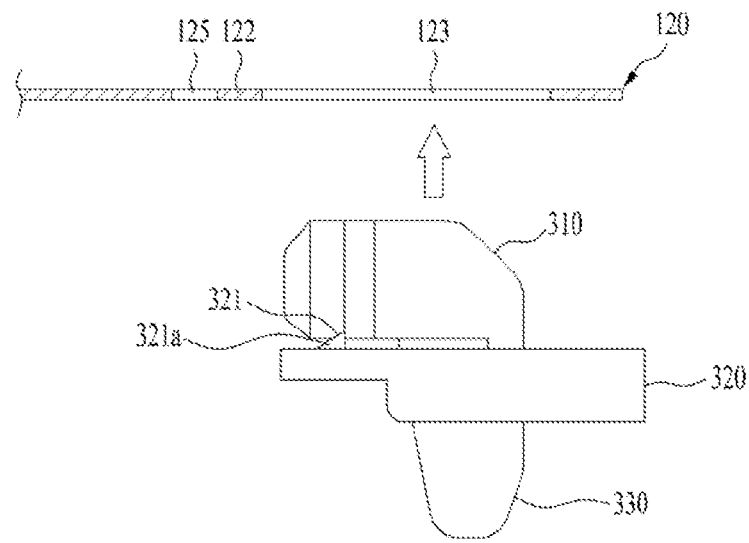
FIGS. 8A to 8C are simplified diagrams showing an installation process of an aligning leg according to an embodiment of the present disclosure.
Figure 8B:
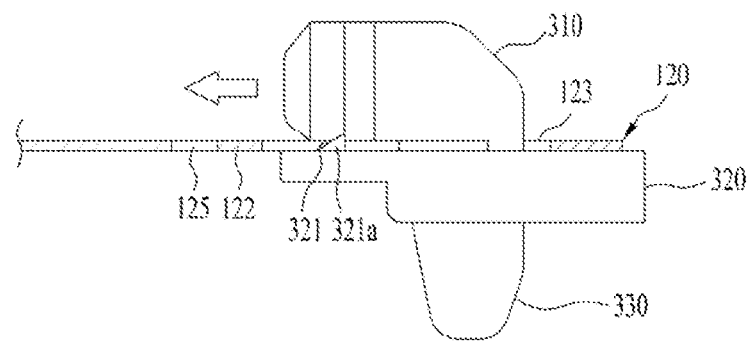
Figure 8C:
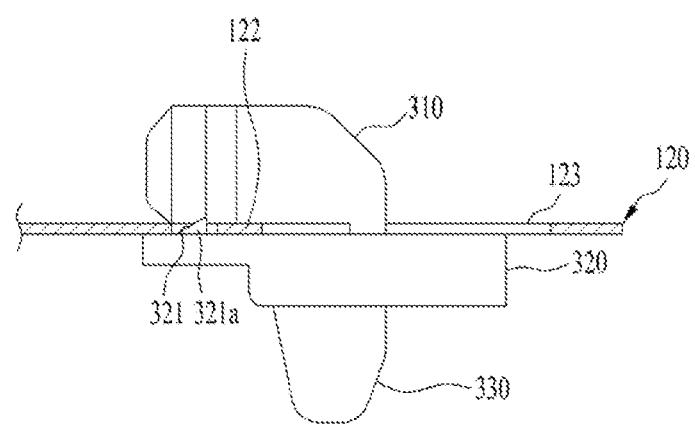

FIGS. 8A to 8C are simplified diagrams showing an installation process of the aligning leg 300 according to an embodiment of the present disclosure. In this connection, FIG. 8A shows a state before the aligning leg 300 is inserted into the upper base panel 120. FIG. 8B shows a state where the aligning leg 300 has been inserted into the upper base panel 120. FIG. 8C shows a state where the aligning leg 300 is coupled and fixed to the upper base panel 120.

As shown in FIG. 8A, in order to fasten the aligning leg 300 to the upper base panel 120, the aligning leg 300 may be placed under the leg receiving portion 122 of the upper base panel 120, and the upper end supporting portion 310 of the aligning leg 300 may be inserted into the through-hole 123 of the leg receiving portion 122 so that the top face of the body 320 of the aligning leg 300 is in close contact with a bottom face of the upper base panel 120.

In this connection, the aligning leg 300 is in contact with the bottom face of the upper base panel 120 and is not fixed to the leg receiving portion 122.

In one example, as shown in FIG. 8B, while the aligning leg 300 is in contact with the bottom face of the upper base panel 120, the aligning leg 300 is pressed inwardly of the upper base panel 120, such that the mounting protrusion 321 formed on the body 320 is pressed into the inner end of the through-hole 123. Thus, as the mounting protrusion 321 slides along the bottom face of the leg receiving portion 122, the mounting protrusion 321 is moved along the bottom of the upper base panel 120.

In this connection, an inner end of the through-hole 123 is inserted into the panel support groove 312 formed between the body 320 and the upper end supporting portion 310, and is pressed against and fixed to the top face of the body 320 and the panel support groove 312.

In one example, the mounting protrusion 321 formed on the body 320 is elastically deformed downward by the slit 322 formed in the outer circumferential face of the mounting protrusion 321 and thus is moved along the bottom face of the leg receiving portion 122 and thus is inserted into the receive hole 125 of the leg receiving portion 122.

In one example, as shown in FIG. 8C, the panel support groove 312 of the aligning leg 300 installed in the leg receiving portion 122 of the upper base panel 120 is supported on an inner face of the through-hole 123 facing toward an inner face of the upper base panel 120, so that the movement of the upper base panel 120 in the inward direction is prevented.

Further, as the mounting protrusion 321 of the aligning leg 300 is inserted into the receiving hole 125 of the leg receiving portion 122 by a predefined elastic force, such that the aligning leg 300 may be prevented from being separated outwardly from the upper base panel 120.

The aligning legs 300 may be disposed on each of the rear and front sides of the upper base panel 120. When the upper treating apparatus 100 is seated on the lower treating apparatus 200, the aligning legs 300 may be interposed between the lower side panels 214 of the lower treating apparatus 200, such that a position in a lateral direction at which the upper treating apparatus 100 is mounted may be aligned.

Hereinafter, with reference to the accompanying drawings, an operation of the aligning leg 300 when the upper treating apparatus 100 is seated on the lower treating apparatus 200 will be described in detail.

Figure 9A:
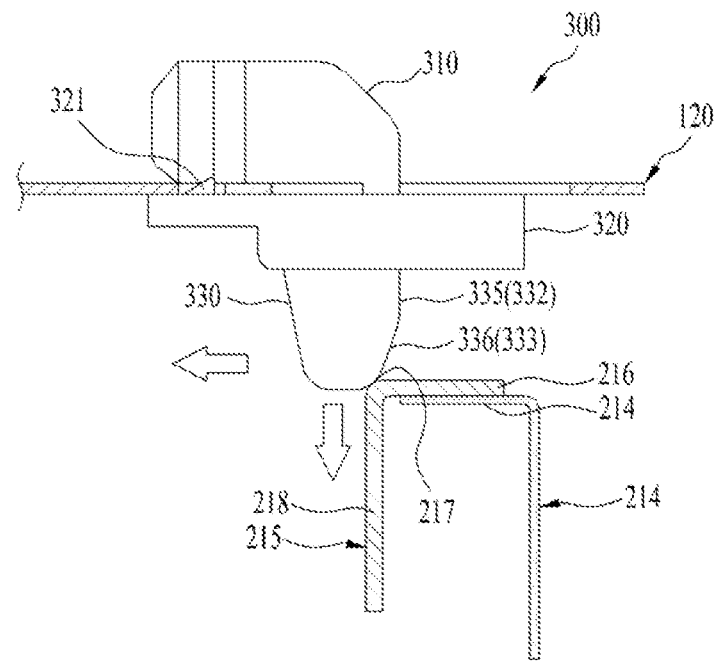
FIGS. 9A and 9B are simplified diagrams showing a portion of a stacking process between an upper treating apparatus and a lower treating apparatus using an aligning leg according to an embodiment of the present disclosure.
Figure 9B:
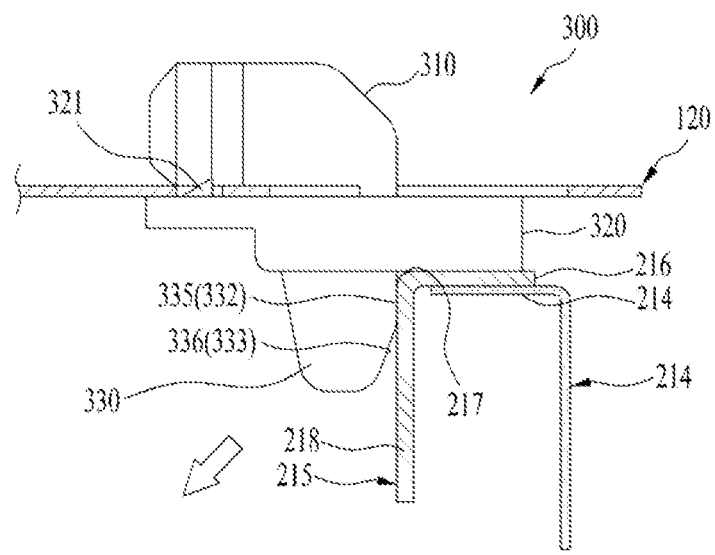

FIGS. 9A and 9B are simplified diagrams showing a portion of the installation process in which the upper treating apparatus 100 is seated on the lower treating apparatus 200 using the aligning leg 300 according to an embodiment of the present disclosure.

In this connection, FIG. 9A shows a misalignment state when the upper treating apparatus 100 is seated on the lower treating apparatus 200. FIG. 9B shows a correct alignment state that after the upper treating apparatus 100 is seated on the lower treating apparatus 200.

In one example, the aligning legs 300 according to one embodiment of the present disclosure may be arranged in a symmetrical manner on both front and rear sides of the lower base panel 219a. The rail frames 215 contacting the aligning legs 300 may be arranged symmetrically on both sides of the top face of the lower side panel 214.

Further, when one of the aligning legs 300 arranged symmetrically on the upper base panel 120 is misaligned, the other of the aligning legs 300 is positioned so as not to contact the rail frame 215.

Therefore, in following descriptions, an example in which when the upper treating apparatus 100 is seated on the lower treating apparatus 200, one aligning leg 300 among the aligning legs 300 disposed on the upper base panel 120 is in a misaligned state with respect to the rail frame 215 of the lower treating apparatus 200 will be described.

In one example, when the upper treating apparatus 100 is disposed on top of the lower treating apparatus 200, and when lateral misalignment of the upper treating apparatus 100 respect to the lower treating apparatus 200 occurs, the lower end supporting portion 330 of one aligning leg 300 may be located on a top of the lower side panel 214 of the lower treating apparatus 200.

Specifically, when the upper treating apparatus 100 is seated on the top of the lower treating apparatus 200, and when the upper treating apparatus 100 is misaligned respect to the lower treating apparatus 200, the center leg 331 and the side legs 334 of the lower end supporting portion 330 of one side aligning leg 300 of the upper treating apparatus 100 are not located on the inner face of one rail frame 215 disposed on the lower side panel 214 of the lower treating apparatus 20 but are located on a top of one rail frame 215.

In this connection, a position of the upper treating apparatus 100 is adjusted to align the upper treating apparatus 100 and the lower treating apparatus 200 with each other. Thus, as shown in FIG. 9A, the center inclined face 333 and the side inclined faces 336 respectively formed on the center leg 331 and the side legs 334 of the aligning leg 300 contact the curved face 217 of the rail frame 215.

In one example, when a position of the aligning leg 300 is moved to a position where the center inclined face 333 and the side inclined faces 336 respectively formed on the center leg 331 and the side legs 334 of the aligning leg 300 contact the curved face 217 of the rail frame 215, the aligning leg 300 is pressed downward under a load of the upper treating apparatus 100, such that the center inclined face 333 and the side inclined faces 336 respectively formed on the center leg 331 and the side legs 334 of the aligning leg 300 slides downwards along the curved face 217 of the rail frame 215.

Therefore, the body 320 of the aligning leg 300 of the upper treating apparatus 100 is disposed on the top of the horizontal frame 216 of the rail frame 215 as shown in FIG. 9B. The center support face 332 and the side support faces 335 of the center leg 331 and the side legs 334 of the aligning leg 300 may face-contact the vertical frame 218 of the rail frame 215.

In this connection, the lower end supporting portion 330 of each of the aligning legs 300 located on each of both sides of the upper base panel 120 is located inwardly of the lower side panel 214 of the lower treating apparatus 200, and is pressed inwardly of the upper base panel 120 by each rail frame 215 of the lower side panel 214 while being supported on each rail frame 215 of the lower side panel 214.

Therefore, each aligning leg 300 installed on the upper base panel 120 is prevented from being separated from the upper base panel 120 due to the pressure acting inwardly of the upper base panel 120 by the lower side panel 214.

Further, each aligning leg 300 installed on the upper base panel 120 may maintain a firm coupled state to the upper base panel 120 by the pressure applied by the lower side panel 214 as the upper treating apparatus 100 is seated on the lower treating apparatus 200.

In one example, the aligning leg 300 as described above is configured to achieve alignment of the upper treating apparatus 100 with the lower treating apparatus 200 when the upper treating apparatus 100 is stacked on the lower treating apparatus 200. In another example, when manufacturing the upper treating apparatus 100, the aligning leg 300 may be used for stacked storage of the upper base panel 120.

That is, the upper base panel 120 is formed as a plate having a predefined area. A plurality of upper base panels 120 may be stacked and stored in a state in which the aligning legs 300 are inserted into both sides of the upper base panels 120.

Figure 10:
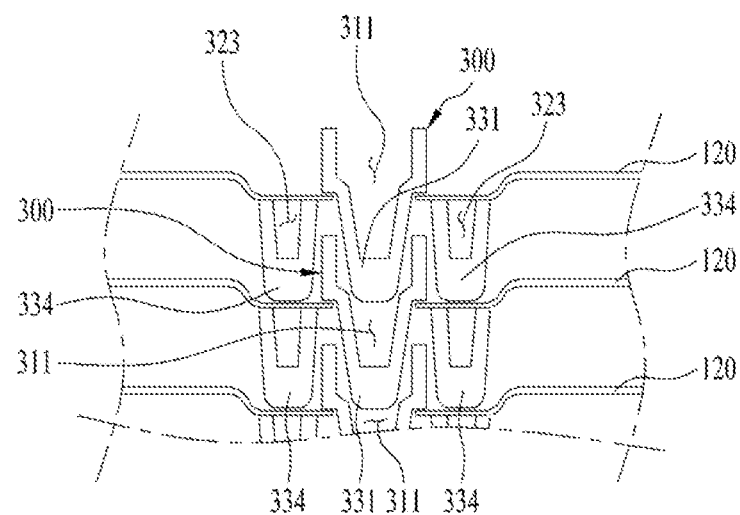
FIG. 10 is a simplified diagram showing a stacked state of upper base panels according to an embodiment of the present disclosure.

FIG. 10 is a simplified diagram showing a stacked state of the upper base panels 120 according to an embodiment of the present disclosure. In this connection, FIG. 10 shows a cross section of the leg receiving portions 122 of the upper base panel 120 and the aligning legs 300 in a state when the upper base panels 120 are stacked and stored.

As shown in FIG. 10, in order to stack a plurality of upper base panels 120, the aligning legs 300 must be installed on both sides of the upper base panels 120. The structure and the installation state of the aligning legs 300 may be understood based on the descriptions of the above-described embodiment.

In this connection, the aligning legs 300 installed on the stacked upper base panels 120 may be stacked in an overlapping manner. The upper base panels 120 may be spaced apart from each other by predefined spacing via the lower end supporting portion 330 of the aligning leg 300.

In one example, the aligning leg 300 may be supported and seated on a top of another aligning leg 300 having the center leg 331 and the side leg 334 of the lower end supporting portion 330 as located below the aligning leg 300.

At this time, the center leg 331 of the corresponding aligning leg 300 is inserted into the center leg groove 311 formed in the upper end supporting portion 310 of another aligning leg 300 located below the corresponding aligning leg 300. Each side leg 334 of the corresponding aligning leg 300 is inserted into the side leg groove 323 of another aligning leg 300.

Therefore, the aligning leg 300 of a first upper base panel 120 on a top of a second upper base panel 120 is seated on a top of the aligning leg 300 of the second upper base panel 120. In this way, the aligning legs 300 may be stacked while maintaining a spacing between the plurality of overlapping upper base panels 120.

Hereinafter, another embodiment of an aligning leg 300 according to the present disclosure will be described in detail with reference to the accompanying drawings.

Figure 11:
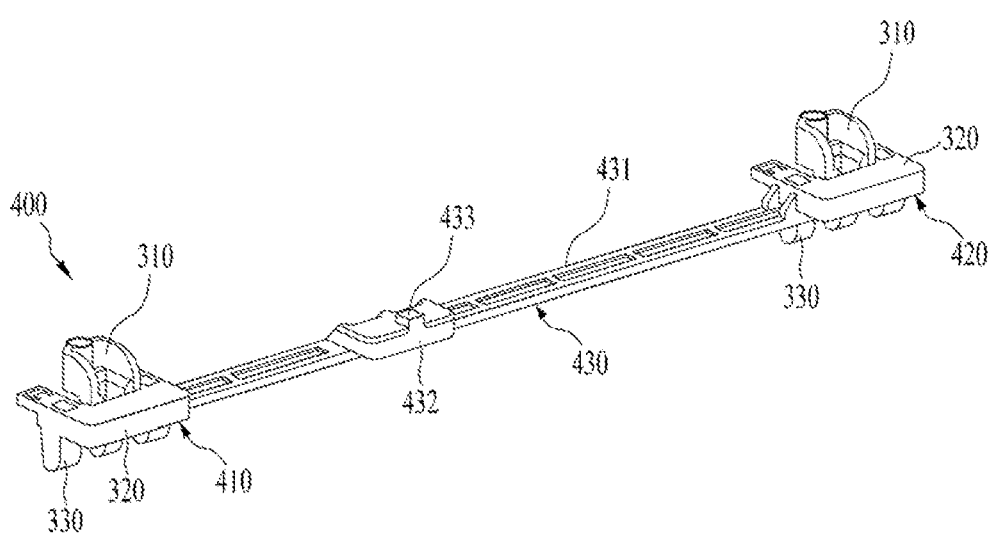
FIG. 11 is a perspective view showing an aligning member according to another embodiment of the present disclosure.
Figure 12:
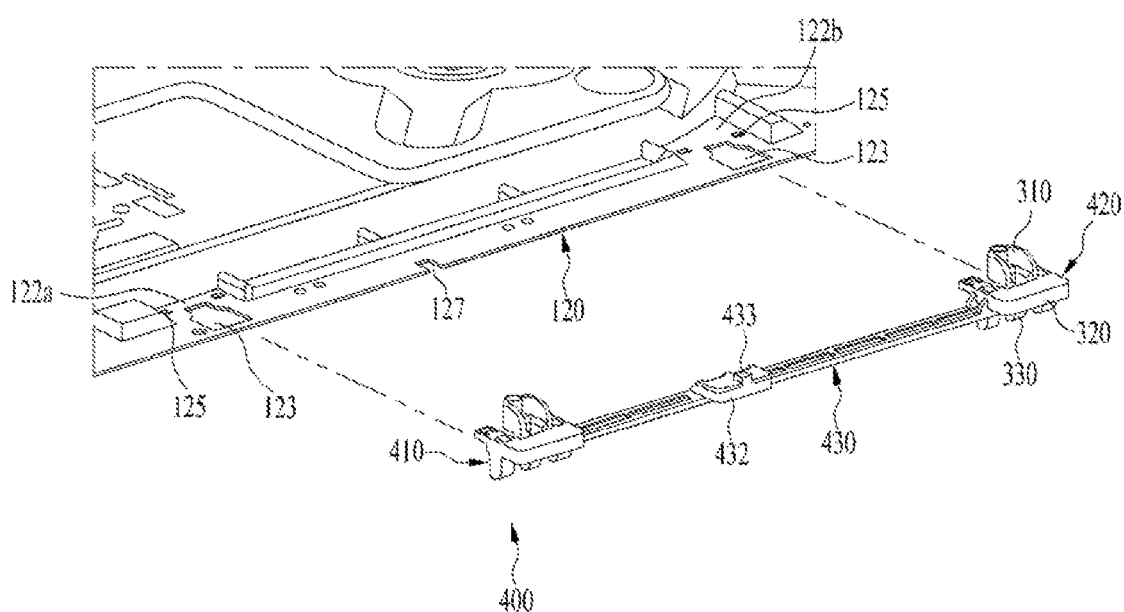
FIG. 12 is an exploded perspective view showing an aligning member and an upper base to be coupled to each other according to another embodiment of the present disclosure.

FIG. 11 is a perspective view showing an aligning member 400 according to another embodiment of the present disclosure. FIG. 12 is an exploded perspective view showing the aligning member 400 and the upper base panel 120 to be coupled to each other according to another embodiment of the present disclosure.

In another embodiment of the present disclosure, in order to simplify the installation of the aligning legs 300 installed on the upper base panel 120, at least two aligning legs 300 that are disposed on one side or the other side of the upper base panel 120 among a plurality of aligning leg 300 installed on both sides of the upper base panel 120 are integrated with each other to form the aligning member 400.

When using the aligning member 400 according to another embodiment of the present disclosure, the installation of the aligning legs 300 installed on the upper base panel 120 may be simplified compared to a process of individually mounting the plurality of aligning leg 300 on the upper base panel 120. That is, when installing the aligning member 400, the plurality of aligning leg 300 may be installed.

As shown in FIG. 11, the aligning member 400 according to another embodiment of the present disclosure has a first aligning leg 410 and a second aligning leg 420 spaced apart by a predetermined spacing, and a connection bar 430 connecting the first aligning leg 410 and the second aligning leg 420 to each other. In one example, the first aligning leg 410, the second aligning leg 420, and the connection bar 430 may be integrally formed and may be made of the same material, and may be manufactured via injection molding.

In this connection, each of the first aligning leg 410 and the second aligning leg 420 have the same configuration as the aligning leg 300 of the above-described embodiment, and thus, the detailed description thereof will be omitted. Further, the description of the first aligning leg 410 and the second aligning leg 420 may refer to the description of the above-described embodiment.

In one example, a first leg receiving portion 122a and a second leg receiving portion 122b may be formed on one side of the upper base panel 120 and may be spaced from each other by a spacing corresponding to a spacing between the first aligning leg 410 and the second aligning leg 420. Further, a positioning groove 127 may be formed between the first leg receiving portion 122a and the second leg receiving portion 122b and at a position corresponding to a position of a positioning protrusion 433 disposed on the connection bar 430.

In this connection, each of the first leg receiving portion 122a and the second leg receiving portion 122b have the same configuration as that of the leg receiving portion 122 of the above-described embodiment, and detailed descriptions thereof will be omitted. Further, the description of the first leg receiving portion 122a and the second leg receiving portion 122b may refer to the description of the above-described embodiment.

Further, the first leg receiving portion 122a, the connection bar 430, and the second leg receiving portion 122b constituting the aligning member 400 may be integrally fabricated via injection molding and may be made of a synthetic resin material.

Preferably, the first leg receiving portion 122a, the connection bar 430, and the second leg receiving portion 122b constituting the aligning member 400 may be made of an insulating material that may electrically insulate the upper treating apparatus 100 and the lower treating apparatus 200 from each other. The insulating material may be selected from a variety of materials, according to need, such as a plastic material, a rubber material, or a mixed material of plastic and rubber.

In one example, the connection bar 430 of the aligning member 400 is constructed to connect the body 320 of the first aligning leg 410 and the body 320 of the second aligning leg 420 to each other. The first aligning leg 410 and the second aligning leg 420 which are connected to each other via the connection bar 430 may be spaced from each other by a predefined spacing and may be installed simultaneously on the upper base panel 120.

In this connection, the connection bar 430 may be formed to have a predefined elastic force while connecting the first aligning leg 410 and the second aligning leg 420 to each other while the first aligning leg 410 and the second aligning leg 420 are spaced from each other by a predetermined spacing. The elastic force of the connection bar 430 allows the connection bar 430 to be elastically deformed when the first aligning leg 410 and the second aligning leg 420 are sequentially coupled to the upper base panel 120, so that the first aligning leg 410 and the second aligning leg 420 may be coupled thereto.

In one example, the connection bar 430 may be formed to be thinner than the body 320 of each of the first aligning leg 410 and the second aligning leg 420. Further, the connection bar 430 has a plurality of reinforcing ribs 431 for reinforcing a strength of the connection bar 430. The plurality of reinforcing ribs 431 may extend in a length direction and a width direction of the connection bar 430.

Further, the positioning protrusion 433 that is eccentric from a center of the connection bar 430 and protrudes upward may be further formed on a top of the connection bar 430. The positioning protrusion 433 is inserted into the positioning groove 127 formed in the upper base panel 120 to be described later. This positioning protrusion 433 may allow an assembly worker to accurately grasp an installation direction of the aligning member 400 when the aligning member 400 is installed.

In one example, the upper treating apparatus 100 and the lower treating apparatus 200 may be spaced from each other by predefined spacing due to a thickness of the body 320 of the aligning leg 300 as described above.

That is, the upper side panel 117 of the upper treating apparatus 100 and the lower side panel 214 of the lower treating apparatus 200 may be made of the same metal material, and may be formed by press-molding a conductive metal plate made of steel or stainless steel.

The upper side panel 117 and the lower side panel 214 are made of a conductive material. Thus, when a short circuit occurs while the upper side panel 117 and the lower side panel 214 are in contact with each other, normal operations of the upper and lower treating apparatus 200 may not be secured.

Therefore, the spacing between the upper side panel 117 of the upper treating apparatus 100 and the lower side panel 214 of the lower treating apparatus 200 needs to be achieved. To this end, it is preferable that the aligning leg 300 supporting the upper treating apparatus 100 with respect to the lower treating apparatus 200 is made of an insulating synthetic resin material.

Further, when a gap formed between the upper side panel 117 of the upper treating apparatus 100 and the lower side panel 214 of the lower treating apparatus 200 due to the aligning leg 300 is excessively large, the aesthetics of the laundry treating apparatus 10 may be poor, and foreign substances may inflow through the gap between the upper side panel 117 and the lower side panel 214.

That is, the upper treating apparatus 100 and the lower treating apparatus 200 need to be electrically insulated from each other in order that upper treating apparatus 100 and the lower treating apparatus 200 operate effectively. A minimum clearance or gap is required between the upper side panel 117 and the lower side panel 214 to maintain aesthetics and prevent foreign matter from inflowing.

Hereinafter, a structure for forming the gap between the upper side panel 117 of the upper treating apparatus 100 and the lower side panel 214 of the lower treating apparatus 200 will be described in detail with reference to the accompanying drawings.

Figure 13:
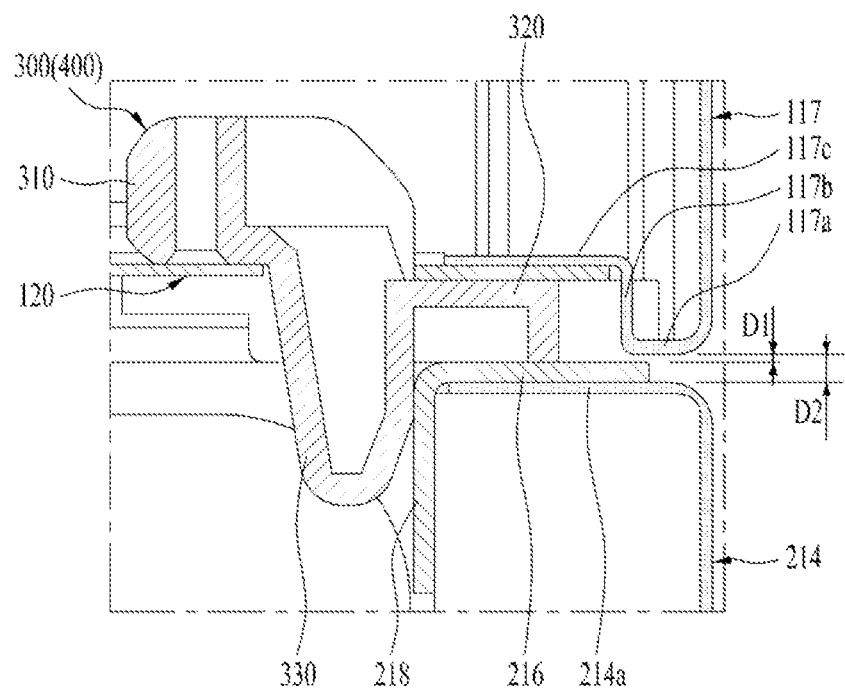
FIG. 13 is a side cross-sectional view showing an upper treating apparatus and a lower treating apparatus according to the present disclosure.

FIG. 13 is a side cross-sectional view showing the upper treating apparatus and the lower treating apparatus according to the present disclosure.

As shown, the lower treating apparatus 200 and the upper treating apparatus 100 seated on the top of the lower treating apparatus 200 are supported by the aligning leg 300. The lower side panel 214 of the lower treating apparatus 200 and the upper side panel 117 of the upper treating apparatus 100 constitute the same vertical plane.

In this connection, a horizontal bent surface 117a that is bent inwardly of the upper treating apparatus 100 extends from a bottom of the upper side panel 117. A vertical bent surface 117b that is bent upwardly of the upper treating apparatus 100 extends from an end of the horizontal bent surface 117a. A base support surface 117c that is bent inwardly of the upper treating apparatus 100 and is supported on the upper base panel 120 extends from an end of the vertical bent surface 117b.

In this connection, the horizontal bent surface 117a of the upper side panel 117 may extend to a position at which the horizontal bent surface 117a may be adjacent to the rail frame 215 disposed on the lower side panel 214, and may be spaced from the rail frame 215 by a predefined spacing D1 (about 0.3 mm or greater). Further, the horizontal bent surface 117a of the upper side panel 117 may extend such that the horizontal bent surface 117a may be spaced from the top face of the lower side panel 214 by a predefined spacing D2 (about 1.6 mm).

That is, the spacing between the horizontal bent surface 117a of the upper side panel 117 and the lower side panel 214 may act as a gap for insulation between the upper treating apparatus 100 and the lower treating apparatus 200.

Further, the aligning leg 300 or the aligning member 400 is mounted on the top of the rail frame 215 located on the top of the lower side panel 214 of the lower treating apparatus 200 as shown. The upper base panel 120 is mounted on the top of the aligning leg 300 or the aligning member 400. In this connection, the upper side panel 117 is supported on the upper base panel 120.

In this connection, the aligning leg 300 or the aligning member 400 may be made of an insulating material that may electrically insulate the upper treating apparatus 100 and the lower treating apparatus 200 from each other. In this way, the aligning leg 300 or the aligning member 400 may electrically insulate the upper treating apparatus 100 and the lower treating apparatus 200 from each other.

In one example, the horizontal bent surface 117a may extend toward the upper base panel 120 by a horizontal dimension shorter than a distance from the outer face of the upper side panel 117 to the outer circumferential face of the upper base panel 120.

That is, the vertical bent surface 117b extending upwards from the end of the horizontal bent surface 117a may extend upward by a vertical dimension shorter than a sum of a thickness of the upper base panel 120 and a thickness of or the body of the aligning leg 300 or the aligning member 400.

Alternatively, to bottom face of the upper side panel 117 may extend up to a level higher than a level of the bottom face of the body 320 of the aligning leg 300. That is, a bottom face of the horizontal bent surface 117a defining the bottom face of the upper side panel 117 may be formed at a level higher than that of the bottom face of the body 320 of the aligning leg 300.

Further, a predefined spacing of about 1.6 mm may be formed between the horizontal bent surface 117a of the upper side panel 117 and the top face of the lower side panel 214. The rail frame 215 disposed on the lower side panel 214 may have a thickness smaller than the spacing between the horizontal bent surface 117a of the upper side panel 117 and the top face of the lower side panel 214.

That is, the horizontal frame 216 of the rail frame 215 may be disposed in the spacing between the horizontal bent surface 117a of the upper side panel 117 and the top face of the lower side panel 214. A portion of the gap between the horizontal bent surface 117a of the upper side panel 117 and the top face of the lower side panel 214 may be shielded by the horizontal frame 216.

As described above, the preferred embodiments according to the present disclosure has been described in detail. However, a person with ordinary knowledge in the technical field to which the present disclosure belongs may implement the present disclosure in various modified manners without deviating from the scope and the spirit of the present disclosure defined in the appended claims. Therefore, the modifications of the embodiments according to the present disclosure may fall into the scope of the present disclosure.

What is claimed is:

1. A stack-type laundry treating system comprising:
   an upper treating apparatus including:
      an upper cabinet including an upper side panel, the upper side panel having (i) an upper lateral side surface and (ii) an upper horizontal surface that extends inward from a lower part of the upper lateral side surface,
      a drying drum disposed in the upper cabinet and configured to rotate, the drying drum being configured to receive one or more objects to be dried,
      an upper driver configured to rotate the drying drum, and
      an air flow passage configured to supply air to and discharge air from the drying drum;
   a lower treating apparatus including:
      a lower cabinet including a lower side panel, the lower side panel having (i) a lower lateral side surface and (ii) a lower horizontal surface that extends inward from a top of the lower lateral side surface,
      a tub disposed in the lower cabinet and configured to receive washing-water,
      a washing drum disposed inside the tub and configured to receive one or more objects to be washed, and
      a lower driver configured to rotate the washing drum;
   a body configured to electrically insulate the upper treating apparatus and the lower treating apparatus from each other when the upper treating apparatus is seated on top of the lower treating apparatus, wherein the body is made of an insulating material, is disposed between the upper horizontal surface and the lower horizontal surface, and defines a spacing between the upper side panel and the lower side panel; and
   a lower end supporting portion that protrudes downwardly from the body and is disposed inside the lower horizontal surface in a width direction of the lower cabinet, the lower end supporting portion being configured to be inserted into a top of the lower treating apparatus.

2. The system of claim 1, wherein the upper horizontal surface includes:
   a horizontal bent surface that is bent inward from a lower end of the upper lateral side surface;
   a vertical bent surface that is bent upward from an inner end of the horizontal bent surface; and
   a support surface that is bent inward from an upper end of the vertical bent surface and disposed on the body.

3. The system of claim 2, wherein an outer end of the body is disposed inside the vertical bent surface in a width direction of the upper cabinet.

4. The system of claim 1, wherein the lower cabinet has an open top that is covered by a bottom of the upper treating apparatus, and
   wherein the lower end supporting portion is configured to, by stacking the upper treating apparatus on the lower treating apparatus, be inserted into the top of the lower treating apparatus in a vertical direction through the open top of the lower cabinet and aligned by the lower side panel of the lower treating apparatus.

5. The system of claim 1, further comprising:
   aligning legs that include the body and the lower end supporting portion,
   wherein the lower end supporting portion protrudes from the body.

6. The system of claim 5, wherein the aligning legs are coupled a bottom of the upper treating apparatus and located at the bottom of the upper treating apparatus.

7. The system of claim 5, wherein the aligning legs include at least a pair of aligning legs that are each disposed at opposing sides of a bottom of the upper treating apparatus.

8. The system of claim 5, wherein the aligning legs are configured to be seated at a top face of the lower side panel and support the upper treating apparatus on the lower treating apparatus.

9. The system of claim 8, wherein the aligning legs are configured to be seated on the lower side panel and slide forward or rearward along the lower side panel.

10. The system of claim 8, wherein the lower side panel has opposing inner side faces, wherein each of the opposing inner side faces of the lower side panel is configured to restrict movement of the aligning legs along a first direction extending between opposing sides of the system.

11. The system of claim 10, wherein the aligning legs are coupled to each of opposing sides of a bottom of the upper treating apparatus and configured to be pressed toward an inner side of the bottom of the upper treating apparatus.

12. The system of claim 5, further comprising:
a rail frame that is disposed on a top of the lower side panel,
wherein the aligning legs are configured to contact the rail frame and slide along the rail frame in a front and rear direction.

13. The system of claim 5, wherein each of the aligning legs includes:
an upper end supporting portion that protrudes from a top of the body.

14. The system of claim 13, wherein a bottom of the upper treating apparatus defines a through-hole configured to receive the upper end supporting portion, and
wherein the upper end supporting portion defines a panel support groove into which a portion of the bottom of the upper treating apparatus is inserted, the portion of the bottom of the upper treating apparatus defining an inner face of the through-hole.

15. The system of claim 13, wherein the body of each of the aligning legs has a mounting protrusion that protrudes upward from the body, and
wherein a bottom of the upper treating apparatus defines a receiving hole into which the mounting protrusion is fixedly received.

16. The system of claim 15, wherein the mounting protrusion of the body has an inclined face that is inclined downward toward the bottom of the upper treating apparatus.

17. The system of claim 15, wherein the body of each of the aligning legs defines a slit around the mounting protrusion configured to elastically support an end of the mounting protrusion.

18. The system of claim 13, wherein the lower end supporting portion of each of the aligning legs has at least one leg that protrudes from a bottom of the body and is configured to slide along the lower cabinet and contact the lower cabinet.

19. The system of claim 18, wherein the at least one leg of the lower end supporting portion has a support face that contacts each of opposing inner side faces of the lower side panel, and
wherein the at least one leg of the lower end supporting portion has an inclined face inclined from the support face toward an inner side of a bottom of the upper treating apparatus.

20. The system of claim 19, further comprising:
a rail frame disposed on a top of the lower side panel,
wherein the inclined face of the at least one leg of the lower end supporting portion is configured to contact the rail frame and slide along the rail frame.

21. The system of claim 20, wherein the rail frame has (i) a horizontal frame that contacts a top face of the lower side panel and (ii) a vertical frame that contacts an inner side face of the lower side panel, and
wherein an edge between the horizontal frame and the vertical frame has a curved face along which the inclined face of the at least one leg of the lower end supporting portion slides.

22. The system of claim 21, wherein the curved face is configured to, based on the upper treating apparatus being seated on the lower treating apparatus, align each of the aligning legs in a first direction extending between opposing sides of the system.

23. The system of claim 21, wherein the horizontal frame of the rail frame is configured to support a bottom face of the body of each of the aligning legs and allow the upper treating apparatus to move forward or backward with respect to the lower treating apparatus.

24. The system of claim 23, wherein the horizontal frame includes a stopper that extends from a rear end of the horizontal frame and is configured to limit a rearward moving distance of the lower end supporting portion of each of the aligning legs.

25. A stack-type laundry treating system comprising:
an upper treating apparatus including:
an upper cabinet including an upper side panel and an upper base panel,
a drying drum disposed in the upper cabinet and configured to rotate, the drying drum being configured to receive one or more objects to be dried,
an upper driver configured to rotate the drying drum, and
an air flow passage configured to supply air to and discharge air from the drying drum;
a lower treating apparatus including:
a lower cabinet including a lower side panel and an open top, wherein the open top of the lower cabinet is covered by the upper base panel,
a tub disposed in the lower cabinet and configured to receive washing-water,
a washing drum disposed inside the tub and configured to receive one or more objects to be washed, and
a lower driver configured to rotate the washing drum; and
aligning legs, an upper part of the aligning legs being coupled to the upper base panel,
wherein, based on the upper treating apparatus being mounted on the lower treating apparatus, a lower part of the aligning legs is inserted in a vertical direction through the open top of the lower cabinet and is aligned by the lower side panel of the lower treating apparatus,
wherein the aligning legs are seated at a top face of the lower side panel and supports the upper treating apparatus with respect to the lower treating apparatus,
wherein the aligning legs are seated and configured to slide forward or rearward along the lower side panel, and
wherein the system further comprises a rail frame that is disposed on a top of the lower side panel, wherein the aligning legs contact the rail frame and slide along the rail frame in a front and rear direction.

26. A stack-type laundry treating system comprising:
an upper treating apparatus including:
- an upper cabinet including an upper side panel and an upper base panel,
- a drying drum disposed in the upper cabinet and configured to rotate, the drying drum being configured to receive one or more objects to be dried,
- an upper driver configured to rotate the drying drum, and
- an air flow passage configured to supply air to and discharge air from the drying drum;

a lower treating apparatus including:
- a lower cabinet including a lower side panel and an open top, wherein the open top of the lower cabinet is covered by the upper base panel,
- a tub disposed in the lower cabinet and configured to receive washing-water,
- a washing drum disposed inside the tub and configured to receive one or more objects to be washed, and
- a lower driver configured to rotate the washing drum; and aligning legs, an upper part of the aligning legs being coupled to the upper base panel,
wherein, based on the upper treating apparatus being mounted on the lower treating apparatus, a lower part of the aligning legs is inserted in a vertical direction through the open top of the lower cabinet and is aligned by the lower side panel of the lower treating apparatus,
wherein each of the aligning legs includes:
- a body that supports a bottom of the upper base panel,
- an upper end supporting portion protruding from a top of the body, and
- a lower end supporting portion protruding from a bottom of the body, wherein the lower end supporting portion is aligned by the lower cabinet, wherein the upper base panel defines a through-hole configured to receive the upper end supporting portion, and
wherein the upper end supporting portion defines a panel support groove into which a portion of the upper base panel is inserted, the portion of the upper base panel defining an inner face of the through-hole.

* * * * *